United States Patent
Tsai et al.

(10) Patent No.: US 10,708,789 B2
(45) Date of Patent: Jul. 7, 2020

(54) APPARATUSES AND METHODS FOR BEAM IDENTIFICATION THROUGH THE PHYSICAL RANDOM ACCESS CHANNEL (PRACH) AND EFFICIENT PRACH RESOURCE UTILIZATION

(71) Applicant: MEDIATEK INC., Hsin-Chu (TW)

(72) Inventors: Chiou-Wei Tsai, Hsinchu (TW);
Guo-Hau Gau, Hsinchu (TW);
Chia-Hao Yu, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/935,386

(22) Filed: Mar. 26, 2018

(65) Prior Publication Data
US 2018/0279136 A1 Sep. 27, 2018

Related U.S. Application Data

(60) Provisional application No. 62/475,970, filed on Mar. 24, 2017, provisional application No. 62/475,966, filed on Mar. 24, 2017.

(51) Int. Cl.
*H04W 16/28* (2009.01)
*H04L 5/00* (2006.01)
(Continued)

(52) U.S. Cl.
CPC .............. *H04W 16/28* (2013.01); *H04L 5/005* (2013.01); *H04L 5/0048* (2013.01);
(Continued)

(58) Field of Classification Search
None
See application file for complete search history.

(56) References Cited

U.S. PATENT DOCUMENTS

| 5,488,724 A | 1/1996 | Firoozmand |
| 9,756,562 B2 | 9/2017 | Matsunaga et al. |

(Continued)

FOREIGN PATENT DOCUMENTS

| CN | 102448169 A | 5/2012 |
| CN | 103874126 A | 6/2014 |

(Continued)

OTHER PUBLICATIONS

"RACH Procedures and Resource Configuration;" 3GPP TSG RAN WG1 Meeting #88; Feb. 2017; pp. 1-7.
(Continued)

*Primary Examiner* — Phuongchau Ba Nguyen
(74) *Attorney, Agent, or Firm* — McClure, Qualey & Rodack, LLP

(57) ABSTRACT

A User Equipment (UE) including a wireless transceiver and a controller is provided. The wireless transceiver performs wireless transmission and reception to and from a cellular station. The controller selects a downlink reference signal associated with a candidate beam among a plurality of downlink reference signals including Channel State Information-Reference Signal (CSI-RS) resources, Synchronization Signal (SS) blocks, or Physical Broadcast Channel (PBCH) blocks, and determines one from a plurality sets of Physical Random Access Channel (PRACH) preambles and RACH occasions for the selected downlink reference signal according to an association configured between the downlink reference signals and PRACH resources. Also, the controller uses the determined set of PRACH preamble and RACH occasion to perform a PRACH transmission to the cellular station via the wireless transceiver.

22 Claims, 12 Drawing Sheets

(51) Int. Cl.
*H04W 74/08* (2009.01)
*H04W 72/04* (2009.01)
*H04W 74/00* (2009.01)

(52) U.S. Cl.
CPC ......... *H04L 5/0055* (2013.01); *H04W 72/046* (2013.01); *H04W 74/0833* (2013.01); *H04L 5/0023* (2013.01); *H04W 74/006* (2013.01)

(56) References Cited

U.S. PATENT DOCUMENTS

| | | |
|---|---|---|
| 9,763,158 B2 | 9/2017 | Yang et al. |
| 9,900,891 B1 * | 2/2018 | Islam ............... H04W 36/0055 |
| 2008/0267127 A1 | 10/2008 | Narasimha et al. |
| 2012/0082099 A1 | 4/2012 | Bienas et al. |
| 2012/0269122 A1 | 10/2012 | Lee |
| 2014/0226601 A1 | 8/2014 | Park et al. |
| 2014/0376466 A1 | 12/2014 | Jeong et al. |
| 2015/0173105 A1 | 6/2015 | Bergstrom et al. |
| 2015/0326995 A1 | 11/2015 | Li et al. |
| 2016/0119888 A1 | 4/2016 | Kawamoto |
| 2016/0192401 A1 | 6/2016 | Park et al. |
| 2016/0198497 A1 | 7/2016 | Yu et al. |
| 2016/0219571 A1 | 7/2016 | Lin et al. |
| 2016/0309507 A1 | 10/2016 | Park |
| 2016/0353510 A1 | 12/2016 | Zhang et al. |
| 2016/0373222 A1 | 12/2016 | Pralea |
| 2017/0019929 A1 | 1/2017 | Wang et al. |
| 2017/0251460 A1 * | 8/2017 | Agiwal ............ H04W 72/0406 |
| 2018/0063801 A1 | 3/2018 | Lu et al. |
| 2018/0270869 A1 * | 9/2018 | Tsai ................. H04W 74/0833 |

FOREIGN PATENT DOCUMENTS

| | | |
|---|---|---|
| CN | 104756582 A | 7/2015 |
| TW | 201628429 A | 8/2016 |
| WO | 2016/119228 A1 | 8/2016 |
| WO | 2016/198909 A1 | 12/2016 |
| WO | 2017/023352 A1 | 2/2017 |

OTHER PUBLICATIONS

"Discussion on beam recovery mechanism;" 3GPP TSG RAN WG1 Meeting #88; Apr. 2017; pp. 1-5.

* cited by examiner

APPARATUSES AND METHODS FOR BEAM IDENTIFICATION THROUGH THE PHYSICAL RANDOM ACCESS CHANNEL (PRACH) AND EFFICIENT PRACH RESOURCE UTILIZATION

CROSS REFERENCE TO RELATED APPLICATIONS

This Application claims priority of U.S. Provisional Application No. 62/475,966, filed on Mar. 24, 2017, the entirety of which is incorporated by reference herein. Also, this Application claims priority of U.S. Provisional Application No. 62/475,970, filed on Mar. 24, 2017, the entirety of which is incorporated by reference herein.

BACKGROUND OF THE APPLICATION

Field of the Application

The application generally relates to Physical Random Access Channel (PRACH) designs and, more particularly, to apparatuses and methods for beam identification through the PRACH and efficient PRACH resource utilization.

Description of the Related Art

The fifth generation (5G) New Radio (NR) technology is an improvement upon the fourth generation (4G) Long Term Evolution (LTE) technology, which provides extreme data speeds and capacity by utilizing higher, unlicensed spectrum bands (e.g., above 30 GHz, loosely known as millimeter Wave (mmWave)), for wireless broadband communications. Due to the huge path and penetration losses at millimeter wavelengths, a technique called "beamforming" is employed and it assumes an important role in establishing and maintaining a robust communication link.

Beamforming generally requires one or more antenna arrays, each comprising a plurality of antennas. By appropriately setting antenna weights that define the contribution of each one of the antennas to a transmission or reception operation, it becomes possible to shape the sensitivity of the transmission/reception to a particularly high value in a specific beamformed direction. By applying different antenna weights, different beam patterns can be achieved, e.g., different directive beams can be sequentially employed.

During a transmission (Tx) operation, beamforming may direct the signal towards a receiver of interest. Likewise, during a reception (Rx) operation, beamforming may provide a high sensitivity in receiving a signal originating from a sender of interest. Since transmission power may be anisotropically focused, e.g., into a solid angle of interest, beamforming may provide better link budgets due to lower required Tx power and higher received signal power, when compared to conventional practice, which does not employ beamforming and relies on more or less isotropic transmission.

However, the technique mentioned above faces certain challenges. For example, in a multi-beam operation, the movement of a User Equipment (UE), the angular rotation of the UE, or line-of-sight blocking terrain may cause degradation of the signal quality of the active beams. In certain scenarios, signal quality may degrade rapidly and there may not be enough time to switch beams, and consequently, beam failure may occur. Therefore, it is desirable to have a mechanism to recover from beam failure.

Moreover, in the 5G NR technology, there are situations where PRACH preambles may be used for uplink requests when Timing Advance (TA) command and temporary Cell Radio Network Temporary Identifier (C-RNTI) are not required to be transmitted in the responses to the uplink requests. Therefore, it is desirable to improve the PRACH design to adapt to such situations in a more efficient way of PRACH resource utilization.

BRIEF SUMMARY OF THE APPLICATION

In order to solve the aforementioned problems, the present application proposes to recover from beam failures through the PRACH. Specifically, an association between downlink reference signals (such as the Channel State Information-Reference Signal (CSI-RS) resources, Synchronization Signal (SS) blocks, or Physical Broadcast Channel (PBCH) blocks) and PRACH resources (such as PRACH preambles, RACH occasions, or a combination of the above) are provided for beam identification to recover from beam failures or to facilitate handovers from one cell to another. In addition, the present application proposes more flexible PRACH designs for improving the efficiency of PRACH resource utilization. Specifically, different preambles may be flexibly split for asynchronous and synchronous transmissions within a PRACH time-frequency resource, and/or the bandwidth and/or cyclic shift used for synchronous transmission may be reduced to be smaller than those used for asynchronous transmission.

In a first aspect of the application, a User Equipment (UE) comprising a wireless transceiver and a controller is provided. The wireless transceiver is configured to perform wireless transmission and reception to and from a cellular station. The controller is configured to select a downlink reference signal associated with a candidate beam among a plurality of downlink reference signals comprising Channel State Information-Reference Signal (CSI-RS) resources, Synchronization Signal (SS) blocks, or Physical Broadcast Channel (PBCH) blocks, determine one from a plurality sets of Physical Random Access Channel (PRACH) preambles and RACH occasions for the selected downlink reference signal according to an association configured between the downlink reference signals and PRACH resources, and use the determined set of PRACH preamble and RACH occasion to perform a PRACH transmission to the cellular station via the wireless transceiver.

In a second aspect of the application, a method for beam identification through a PRACH, executed by a UE wirelessly connected to a cellular station, is provided. The method for beam identification through a PRACH comprises the steps of: selecting a downlink reference signal associated with a candidate beam among a plurality of downlink reference signals comprising CSI-RS resources, SS blocks, or PBCH blocks; determining one from a plurality sets of PRACH preambles and RACH occasions for the selected downlink reference signal according to an association configured between the downlink reference signals and PRACH resources; and using the determined set of PRACH preamble and RACH occasion to perform a PRACH transmission to the cellular station.

In a third aspect of the application, a cellular station comprising a wireless transceiver and a controller is provided. The wireless transceiver is configured to perform wireless transmission and reception to and from a UE. The controller is configured to receive a PRACH transmission that utilizes a PRACH resource from the UE via the wireless transceiver, determine one of a plurality of downlink reference signals comprising CSI-RS resources, SS blocks, or PBCH blocks according to an association configured between the downlink reference signals and the PRACH resource, and identify a candidate beam associated with the determined downlink reference signal.

In a fourth aspect of the application, a method for beam identification through a PRACH, executed by a cellular station wirelessly connected to a UE, is provided. The method for beam identification through a PRACH comprises the steps of: receiving a PRACH transmission that utilizes a PRACH resource from the UE; determining one of a plurality of downlink reference signals comprising CSI-RS resources, SS blocks, or PBCH blocks according to an association configured between the downlink reference signals and the PRACH resource; and identifying a candidate beam associated with the determined downlink reference signal.

Other aspects and features of the present application will become apparent to those with ordinarily skill in the art upon review of the following descriptions of specific embodiments of the UEs, cellular stations, and the methods for beam identification through a PRACH and for efficient PRACH resource utilization.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
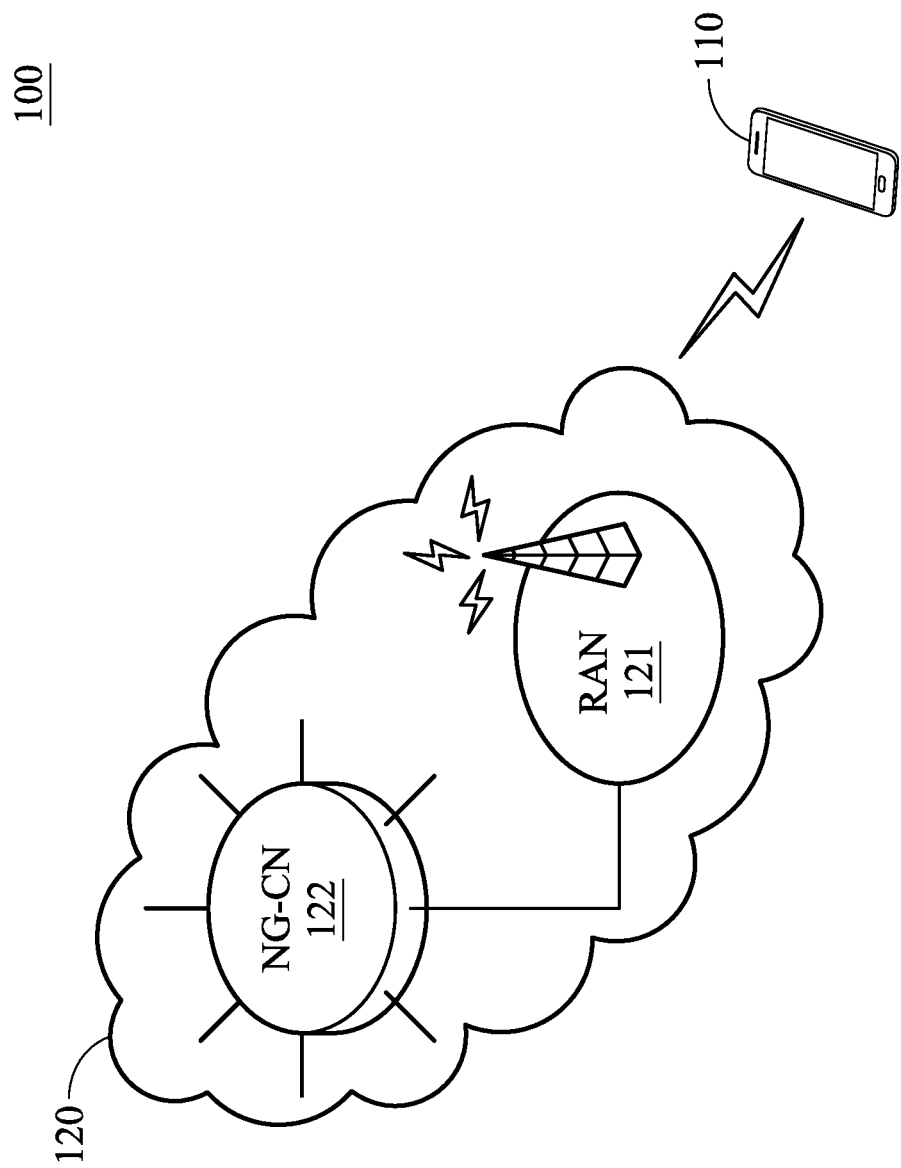
FIG. 1 is a block diagram of a wireless communication environment according to an embodiment of the application.

FIG. 1 is a block diagram of a wireless communication environment according to an embodiment of the application. The wireless communication environment 100 includes a User Equipment (UE) 110 and a 5G NR network 120, wherein the UE 110 may initiate a random access procedure for beam failure recovery, beam handover, or uplink request, and may be wirelessly connected to the 5G NR network 120 for obtaining mobile services.

The UE 110 may be a feature phone, a smartphone, a panel Personal Computer (PC), a laptop computer, or any wireless communication device supporting the cellular technology (i.e., the 5G NR technology) utilized by the 5G NR network 120. Particularly, the wireless communication device employs the beamforming technique for wireless transmission and/or reception.

The 5G NR network 120 includes a Radio Access Network (RAN) 121 and a Next Generation Core Network (NG-CN) 122.

The RAN 121 is responsible for processing radio signals, terminating radio protocols, and connecting the UE 110 with the NG-CN 122. In addition, the RAN 121 is responsible for periodically broadcasting the minimum SI, and providing the other SI by periodic broadcasting or at the request of the UE 110. The RAN 121 may include one or more cellular stations, such as gNBs, which support high frequency bands (e.g., above 24 GHz), and each gNB may further include one or more Transmission Reception Points (TRPs), wherein each gNB or TRP may be referred to as a 5G cellular station. Some gNB functions may be distributed across different TRPs, while others may be centralized, leaving the flexibility and scope of specific deployments to fulfill the requirements for specific cases.

The NG-CN 122 generally consists of various network functions, including Access and Mobility Function (AMF), Session Management Function (SMF), Policy Control Function (PCF), Application Function (AF), Authentication Server Function (AUSF), User Plane Function (UPF), and User Data Management (UDM), wherein each network function may be implemented as a network element on a dedicated hardware, or as a software instance running on a dedicated hardware, or as a virtualized function instantiated on an appropriate platform, e.g., a cloud infrastructure.

The AMF provides UE-based authentication, authorization, mobility management, etc. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functions per session. The AF provides information on the packet flow to PCF responsible for policy control in order to support Quality of Service (QoS). Based on the information, the PCF determines policies about mobility and session management to make the AMF and the SMF operate properly. The AUSF stores data for authentication of UEs, while the UDM stores subscription data of UEs.

It should be understood that the 5G NR network 120 depicted in FIG. 1 is for illustrative purposes only and is not intended to limit the scope of the application. The application may also be applied to other cellular technologies, such as a future enhancement of the 5G NR technology.

Figure 2:
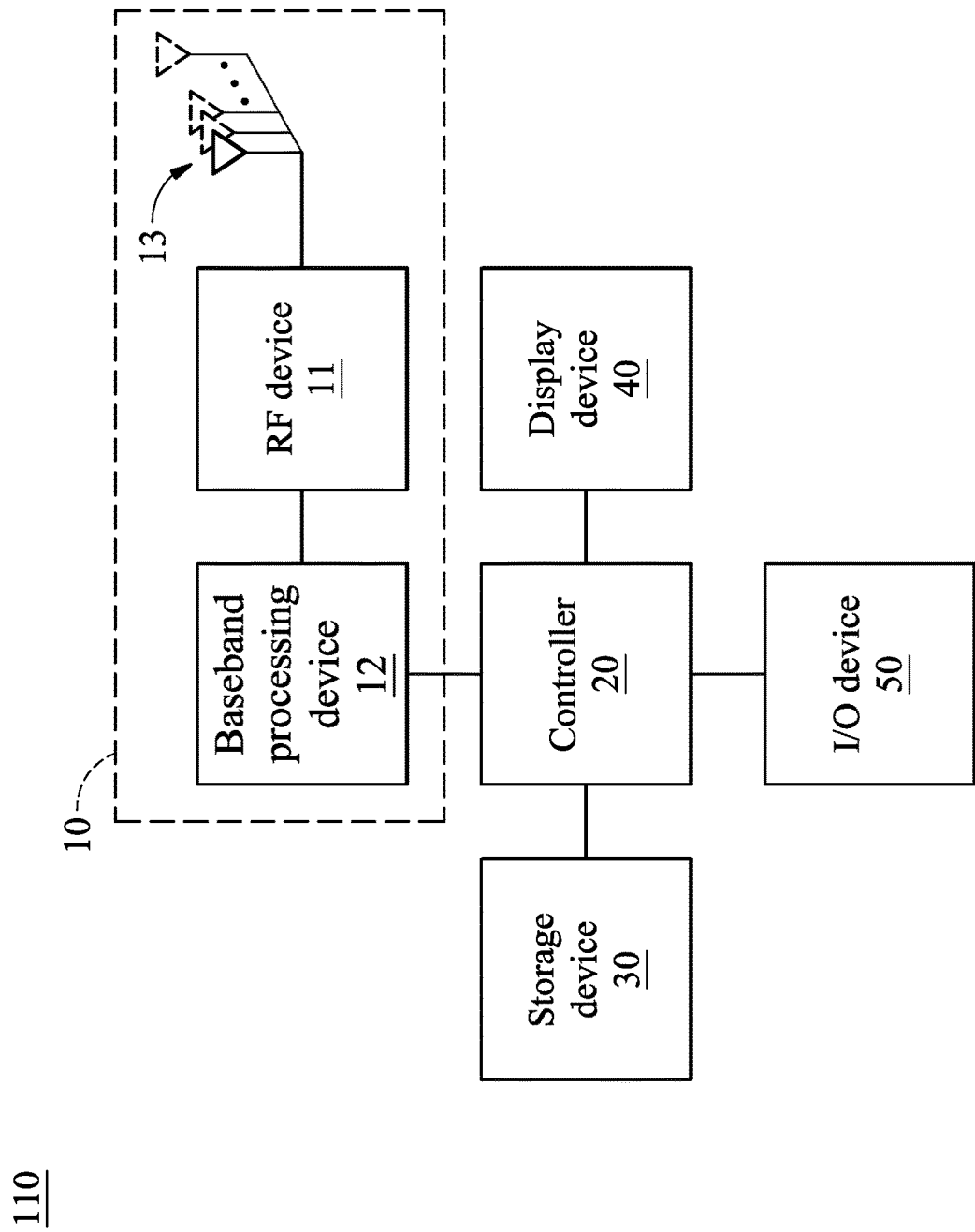
FIG. 2 is a block diagram illustrating the UE 110 according to an embodiment of the application.

FIG. 2 is a block diagram illustrating the UE 110 according to an embodiment of the application. The UE 110 includes a wireless transceiver 10, a controller 20, a storage device 30, a display device 40, and an Input/Output (I/O) device 50.

The wireless transceiver 10 is configured to perform wireless transmission and reception to and from the RAN 121. Specifically, the wireless transceiver 10 includes a Radio Frequency (RF) device 11, a baseband processing device 12, and antenna(s) 13, wherein the antenna(s) 13 may include one or more antennas for beamforming. The baseband processing device 12 is configured to perform baseband signal processing and control the communications between subscriber identity card(s) (not shown) and the RF device 11. The baseband processing device 12 may contain multiple hardware components to perform the baseband signal processing, including Analog-to-Digital Conversion (ADC)/Digital-to-Analog Conversion (DAC), gain adjusting, modulation/demodulation, encoding/decoding, and so on. The RF device 11 may receive RF wireless signals via the antenna(s) 13, convert the received RF wireless signals to baseband signals, which are processed by the baseband processing device 12, or receive baseband signals from the baseband processing device 12 and convert the received baseband signals to RF wireless signals, which are later transmitted via the antenna(s) 13. The RF device 11 may also contain multiple hardware devices to perform radio frequency conversion. For example, the RF device 11 may include a mixer to multiply the baseband signals with a carrier oscillated in the radio frequency of the supported cellular technologies, wherein the radio frequency may be any radio frequency (e.g., 30 GHz-300 GHz for mmWave) utilized in the 5G NR technology, or another radio frequency, depending on the cellular technology in use.

The controller 20 may be a general-purpose processor, a Micro Control Unit (MCU), an application processor, a Digital Signal Processor (DSP), or the like, which includes various circuits for providing the functions of data processing and computing, controlling the wireless transceiver 10 for wireless communications with the RAN 121, storing and retrieving data (e.g., program code) to and from the storage device 30, sending a series of frame data (e.g. representing text messages, graphics, images, etc.) to the display device 40, and receiving signals from the I/O device 50. In particular, the controller 20 coordinates the aforementioned operations of the wireless transceiver 10, the storage device 30, the display device 40, and the I/O device 50 for performing the method for beam identification through the PRACH and the method for efficient PRACH utilization.

In another embodiment, the controller 20 may be incorporated into the baseband processing device 12, to serve as a baseband processor.

As will be appreciated by persons skilled in the art, the circuits of the controller 20 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 is a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing instructions and/or program code of applications, communication protocols, and/or the methods for beam identification through the PRACH and for efficient PRACH utilization.

The display device 40 may be a Liquid-Crystal Display (LCD), a Light-Emitting Diode (LED) display, or an Electronic Paper Display (EPD), etc., for providing a display function. Alternatively, the display device 40 may further include one or more touch sensors disposed thereon or thereunder for sensing touches, contacts, or approximations of objects, such as fingers or styluses.

The I/O device 50 may include one or more buttons, a keyboard, a mouse, a touch pad, a video camera, a microphone, and/or a speaker, etc., to serve as the Man-Machine Interface (MIMI) for interaction with users.

It should be understood that the components described in the embodiment of FIG. 2 are for illustrative purposes only and are not intended to limit the scope of the application. For example, the UE 110 may include more components, such as a power supply, or a Global Positioning System (GPS) device, wherein the power supply may be a mobile/replaceable battery providing power to all the other components of the UE 110, and the GPS device may provide the location information of the UE 110 for use of some location-based services or applications.

Figure 3:
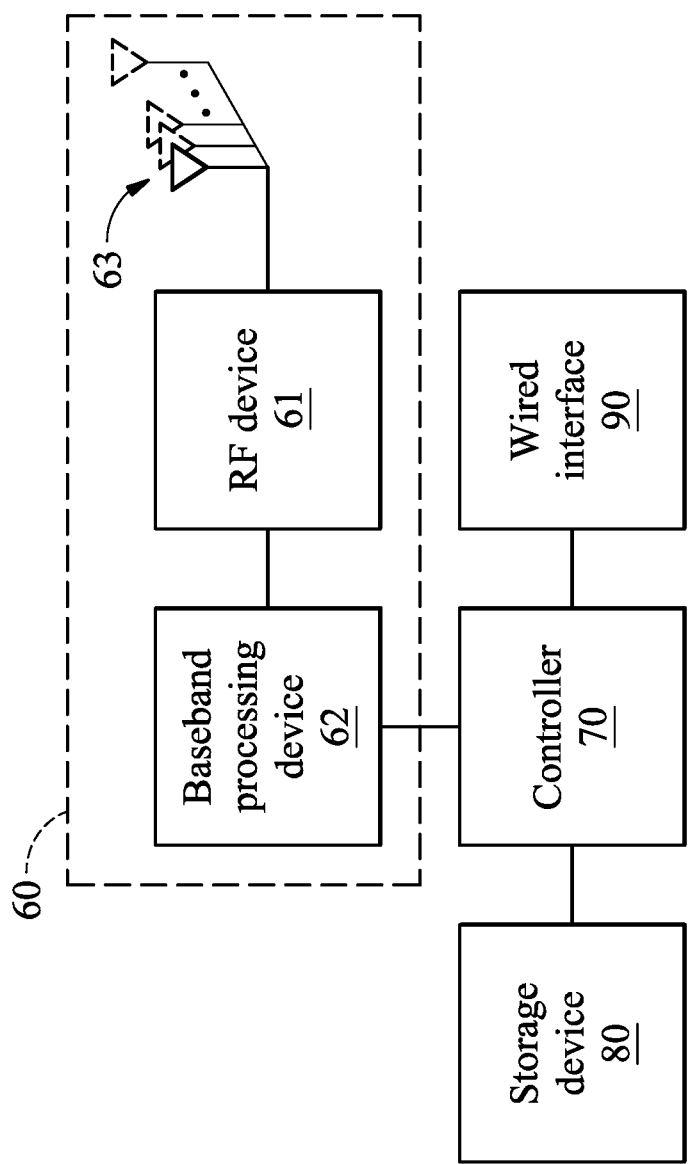
FIG. 3 is a block diagram illustrating a cellular station according to an embodiment of the application.

FIG. 3 is a block diagram illustrating a cellular station according to an embodiment of the application. The cellular station may be a 5G cellular station, such as a gNB or TRP. The cellular station includes a wireless transceiver 60, a controller 70, a storage device 80, and a wired interface 90.

The wireless transceiver 60 is configured to perform wireless transmission and reception to and from the UE 110. Specifically, the wireless transceiver 60 includes an RF device 61, a baseband processing device 62, and antenna(s) 63, wherein the antenna(s) 63 may include one or more antennas for beamforming. The functions of the RF device 61, the baseband processing device 62, and the antenna(s) 63 are similar to those of the RF device 11, the baseband processing device 12, and the antenna(s) 13 as described in the embodiment of FIG. 2, and thus, the detailed description is not repeated herein for brevity.

The controller 70 may be a general-purpose processor, an MCU, an application processor, a DSP, or the like, which includes various circuits for providing the functions of data processing and computing, controlling the wireless transceiver 60 for wireless communications with the UE 110, storing and retrieving data (e.g., program code) to and from the storage device 80, and sending/receiving messages to/from other network entities (e.g., other cellular stations in the RAN 121 or other network entities in the NG-CN 122)

through the wired interface 90. In particular, the controller 70 coordinates the aforementioned operations of the wireless transceiver 60, the storage device 80, and the wired interface 90 to perform the method for beam identification through the PRACH and the method for efficient PRACH utilization.

In another embodiment, the controller 70 may be incorporated into the baseband processing device 62, to serve as a baseband processor.

As will be appreciated by persons skilled in the art, the circuits of the controller 70 will typically include transistors that are configured in such a way as to control the operation of the circuits in accordance with the functions and operations described herein. As will be further appreciated, the specific structure or interconnections of the transistors will typically be determined by a compiler, such as an RTL compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 80 may be a memory, such as a FLASH memory or an NVRAM, or a magnetic storage device, such as a hard disk or a magnetic tape, or an optical disc, or any combination thereof for storing instructions and/or program code of applications, communication protocols, and/or the methods for beam identification through the PRACH and for efficient PRACH utilization.

The wired interface 90 is responsible for providing wired communications with other network entities, such as other cellular stations in the RAN 121, or other network entities in the NG-CN 122. The wired interface 90 may include a cable modem, an Asymmetric Digital Subscriber Line (ADSL) modem, a Fiber-Optic Modem (FOM), and/or an Ethernet interface.

It should be understood that the components described in the embodiment of FIG. 3 are for illustrative purposes only and are not intended to limit the scope of the application. For example, the cellular station may further include other functional devices, such as a display device (e.g., LCD, LED display, or EPD, etc.), an I/O device (e.g., button, keyboard, mouse, touch pad, video camera, microphone, speaker, etc.), and/or a power supply, etc.

Please note that, in the present application, an association between the downlink reference signals and the PRACH preambles and RACH occasions (e.g., time-frequency resources) is configured for indicating the downlink reference signal selected by UE to the cellular station when a PRACH preamble is transmitted by the UE and detected by the cellular station. A RACH occasion is defined as the time-frequency resource on which a PRACH message 1 is transmitted using the configured PRACH preamble format with a single particular TX beam. Furthermore, the usage of PRACH transmission includes new candidate beam identification to recover from beam failures or to facilitate handovers from one cell to another. When a beam failure occurs or a cell handover is triggered, a downlink reference signal associated with a candidate beam will be selected among the set of downlink reference signals associated with all beams, wherein the set of downlink reference signals includes CSI-RS resources, SS blocks, or PBCH blocks, or any combination thereof. Based on the association, the PRACH preambles and RACH occasions corresponding to the newly selected downlink reference signal (i.e., CSI-RS resource or SS/PBCH block) of the candidate beam may be determined, and the UE may transmit a random access preamble according to the determined PRACH preamble on the determined RACH occasion to the gNB. On the other hand, when receiving the random access preamble, the gNB knows that a beam failure occurs or a cell handover is triggered, and knows which beam is the new candidate beam selected by the UE, when receiving the random access preamble, based on the association.

Figure 4:
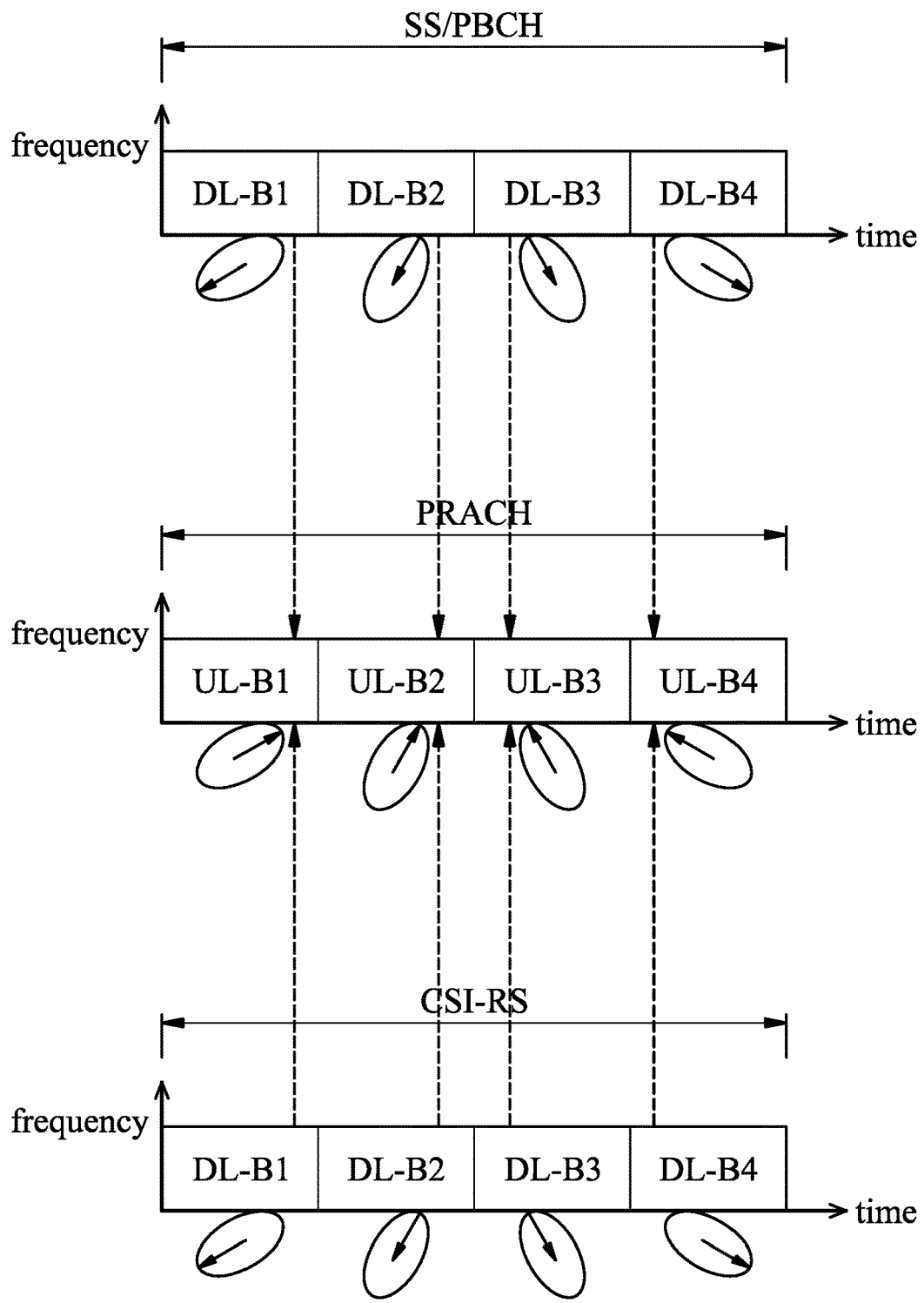
FIG. 4 is a schematic diagram illustrating the associations between CSI-RS resources, SS/PBCH blocks, and a plurality sets of PRACH preambles and RACH occasions according to an embodiment of the application.

FIG. 4 is a schematic diagram illustrating the associations between CSI-RS resources, SS/PBCH blocks, and a plurality sets of PRACH preambles and RACH occasions according to an embodiment of the application.

In this embodiment, the beam width of each CSI-RS resource is substantially the same as the beam width of each SS/PBCH block, and thus, the association between CSI-RS resources and PRACH preambles and RACH occasions can be the same as the association between the SS/PBCH blocks and the PRACH preambles and RACH occasions. That is, the association associates one CSI-RS resource or SS/PBCH block to one set of PRACH preambles and RACH occasions.

As shown in FIG. 4, the first SS/PBCH block and the first CSI-RS resource are corresponding to the first set of PRACH preambles and RACH occasions according to the associations, and thus, the beams used for the first SS/PBCH block and the first CSI-RS resource are corresponding to the beam used for the first set of PRACH preambles and RACH occasions.

Likewise, the second SS/PBCH block and the second CSI-RS resource are corresponding to the second set of PRACH preambles and RACH occasions according to the associations, and thus, the beams used for the second SS/PBCH block and the second CSI-RS resource are corresponding to the beam used for the second set of PRACH preambles and RACH occasions. The third blocks/PBCH block and the third CSI-RS resource are corresponding to the third set of PRACH preambles and RACH occasions according to the associations, and thus, the beams used for the third SS/PBCH block and the third CSI-RS are corresponding to the beam used for the third set of PRACH preambles and RACH occasions. The fourth SS/PBCH block and the fourth CSI-RS resource are corresponding to the fourth set of PRACH preambles and RACH occasions according to the associations, and thus, the beams used for the fourth SS/PBCH block and the fourth CSI-RS resource are corresponding to the beam used for the fourth set of PRACH preambles and RACH occasions.

Please note that, in another embodiment, the associations are configured between CSI-RS resources and the PRACH preambles. For example, the first CSI-RS resource is associated with the first set of PRACH preamble(s), the second CSI-RS resource is associated with the second set of PRACH preamble(s), and so on. In another embodiment, the associations are configured between SS/PBCH blocks and the PRACH preambles. For example, the first SS/PBCH block is associated with the first set of PRACH preamble(s), the second SS/PBCH block is associated with the second set of PRACH preamble(s), and so on. In another embodiment, the associations are configured between CSI-RS resources and the RACH occasions. For example, the first CSI-RS resource is associated with the first RACH occasion(s), the second CSI-RS resource is associated with the second RACH occasion(s), and so on. In another embodiment, the associations are configured between SS/PBCH blocks and the RACH occasions. For example, the first SS/PBCH block is associated with the first RACH occasion(s), the second SS/PBCH block is associated with the second RACH occasion(s), and so on. In another embodiment, the associations are configured between CSI-RS resources and both the PRACH preambles and the RACH occasions. For example, the first CSI-RS resource is associated with the first set of PRACH preamble(s) and the first RACH occasion(s), the second CSI-RS resource is associated with the second set of PRACH preamble(s) and the second RACH occasion(s), and so on. In another embodiment, the associations are configured between SS/PBCH blocks and both the PRACH preambles and the RACH occasions. For example, the first SS/PBCH block is associated with the first set of PRACH preamble(s) and the first RACH occasion(s), the second SS/PBCH block is associated with the second set of PRACH preamble(s) and the second RACH occasion(s), and so on.

That is to say, for purposes not limited to beam failure recovery, new beam identification, and handover, there are associations configured between (1) the CSI-RS resources and RACH resources including preambles, occasions (e.g., time-frequency resources), or a combination thereof, (2) the SS/PBCH blocks and RACH resources including preambles, occasions (e.g., time-frequency resources), or a combination thereof, or (3) the CSI-RS resources and the SS/PBCH blocks and RACH resources including preambles, occasions (e.g., time-frequency resources), or a combination thereof.

Figure 5:
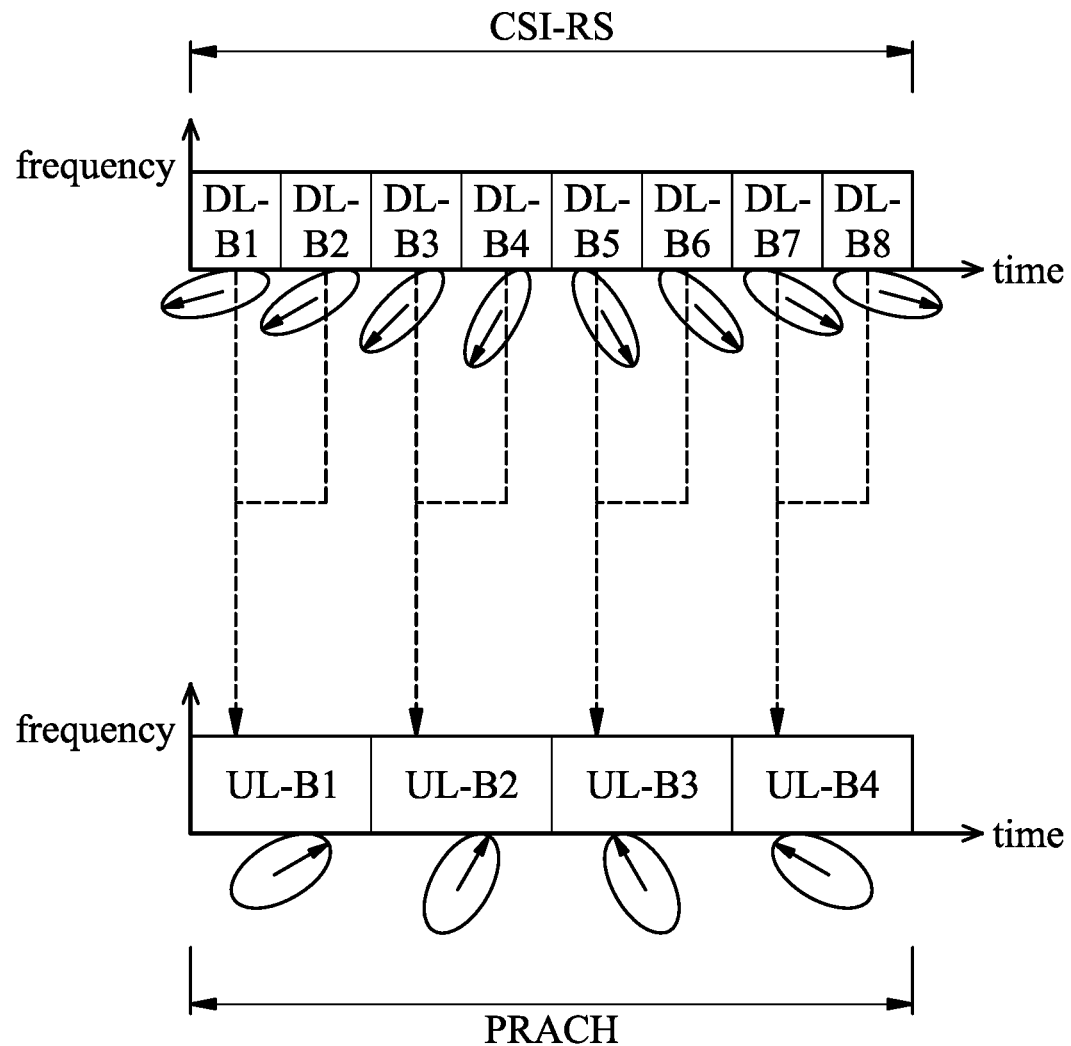
FIG. 5 is a schematic diagram illustrating the association between CSI-RS resources and a plurality sets of PRACH preambles and RACH occasions according to an embodiment of the application.

FIG. 5 is a schematic diagram illustrating the association between CSI-RS resources and a plurality sets of PRACH preambles and RACH occasions according to an embodiment of the application.

In this embodiment, the beam width of each CSI-RS resources is narrower than the beam width of the downlink reference signals (e.g. SS/PBCH blocks) that PRACH preambles and RACH occasions are configured to be associated with. Specifically, the beam width of each CSI-RS resources is substantially half the beam width of the downlink reference signals that PRACH preambles and RACH occasions are associated with. That is, the association associates multiple (e.g., two) CSI-RS resources to one set of PRACH preambles and RACH occasions.

As shown in FIG. 5, the first and second CSI-RS resources are corresponding to the first set of PRACH preambles and RACH occasions according to the association, and thus, the beams used for the first and second CSI-RS resources are corresponding to the beam used for the first set of PRACH preambles and RACH occasions. The third and fourth CSI-RS resources are corresponding to the second set of PRACH preambles and RACH occasions according to the association, and thus, the beams used for the third and fourth CSI-RS resources are corresponding to the beam used for the second set of PRACH preambles and RACH occasions. The fifth and sixth CSI-RS resources are corresponding to the third set of PRACH preambles and RACH occasions according to the association, and thus, the beams used for the fifth and sixth CSI-RS resources are corresponding to the beam used for the third set of PRACH preambles and RACH occasions. The seventh and eighth CSI-RS resources are corresponding to the fourth set of PRACH preambles and RACH occasions according to the association, and thus, the beams used for the seventh and eighth CSI-RS resources are corresponding to the beam used for the fourth set of PRACH preambles and RACH occasions.

In another embodiment, the associations are configured between CSI-RS resources and the PRACH preambles. For example, the first and the second CSI-RS resources are associated with the first set of PRACH preamble(s), the third and fourth CSI-RS resources are associated with the second set of PRACH preamble(s), and so on. In another embodiment, the associations are configured between CSI-RS resources and the RACH occasions. For example, the first and second CSI-RS resources are associated with the first RACH occasion(s), the third and fourth CSI-RS resources are associated with the second RACH occasion(s), and so on.

That is to say, for purposes not limited to beam failure recovery, new beam identification and hangover, there are associations configured between the CSI-RS resources and RACH resources including preambles, occasions (e.g., time-frequency resources), or a combination thereof.

The advantage of this kind of association (i.e., the mapping of multiple CSI-RS resources to one set of PRACH preambles and RACH occasions) is that fewer PRACH resources are required. The disadvantages of this kind of association are that the new beam information is only partially conveyed through the first step of a random access procedure and wider beams are used for the messages in the third step (i.e., scheduling request) and the fourth step (i.e., contention resolution) of a contention-based random access procedure. However, the conveyance of the new beam information may be completed through the message of the third step (i.e., uplink transmission) of a contention-based random access procedure.

Figure 6:
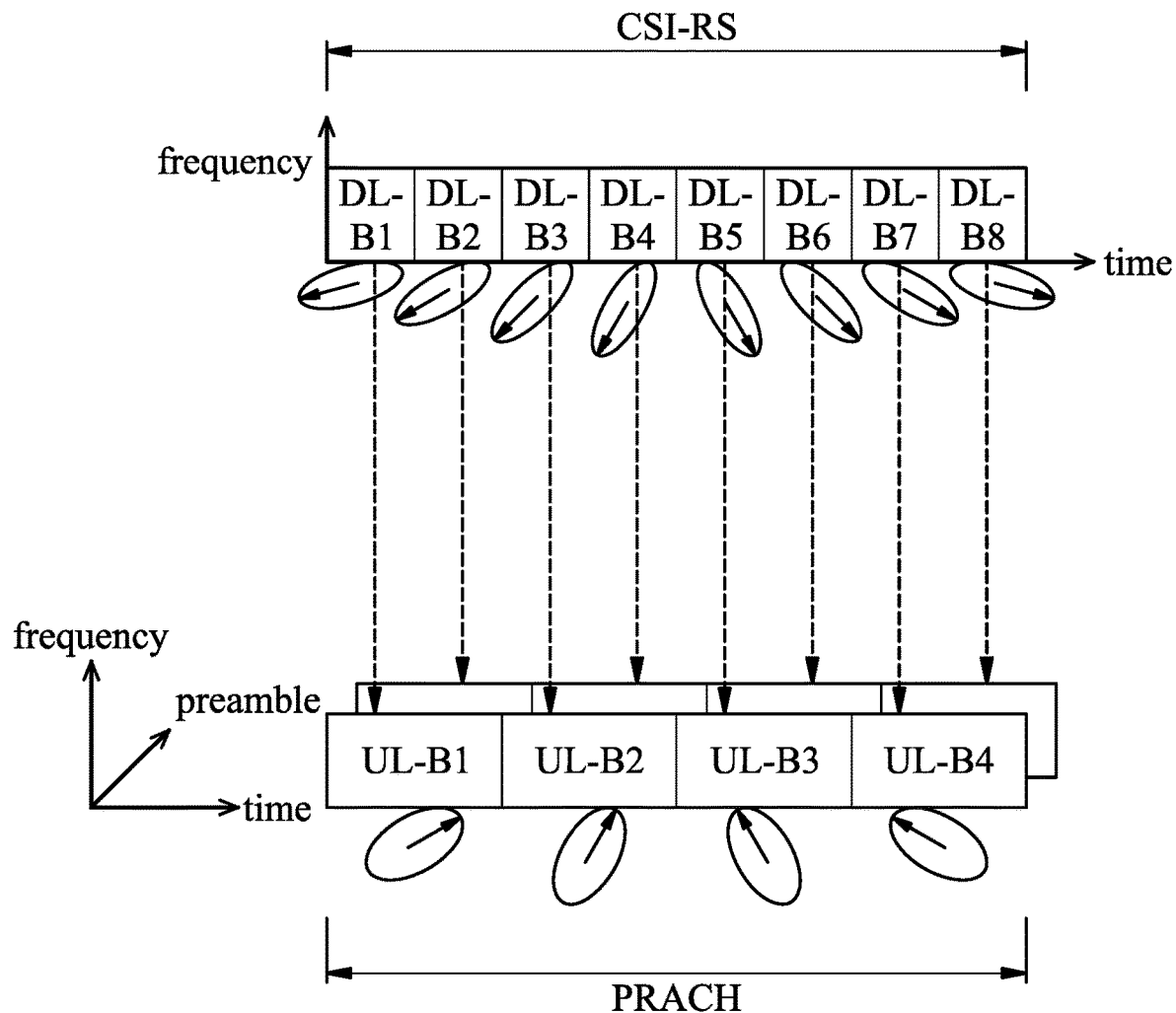
FIG. 6 is a schematic diagram illustrating the association between CSI-RS resources and a plurality sets of PRACH preambles and RACH occasions according to another embodiment of the application.

FIG. 6 is a schematic diagram illustrating the association between CSI-RS resources and a plurality sets of PRACH preambles and RACH occasions according to another embodiment of the application.

In this embodiment, the association associates the CSI-RS resources to the sets of PRACH preambles and RACH occasions by Code Division Multiplexing (CDM).

As shown in FIG. 6, there are at least two sets of PRACH preambles within each RACH occasion, wherein preambles from the two PRACH preamble sets may be differentiated at the code domain (i.e., preamble domain).

The first and second CSI-RS resources are corresponding to the first and second PRACH preamble sets within the first RACH occasion, respectively. The third and fourth CSI-RS resources are corresponding to the first and second PRACH preamble sets within the second RACH occasion, respectively. The fifth and sixth CSI-RS resources are corresponding to the first and second PRACH preamble sets within the third RACH occasion, respectively. The seventh and eighth CSI-RS resources are corresponding to the first and second PRACH preamble sets within the fourth RACH occasion, respectively.

Figure 7:
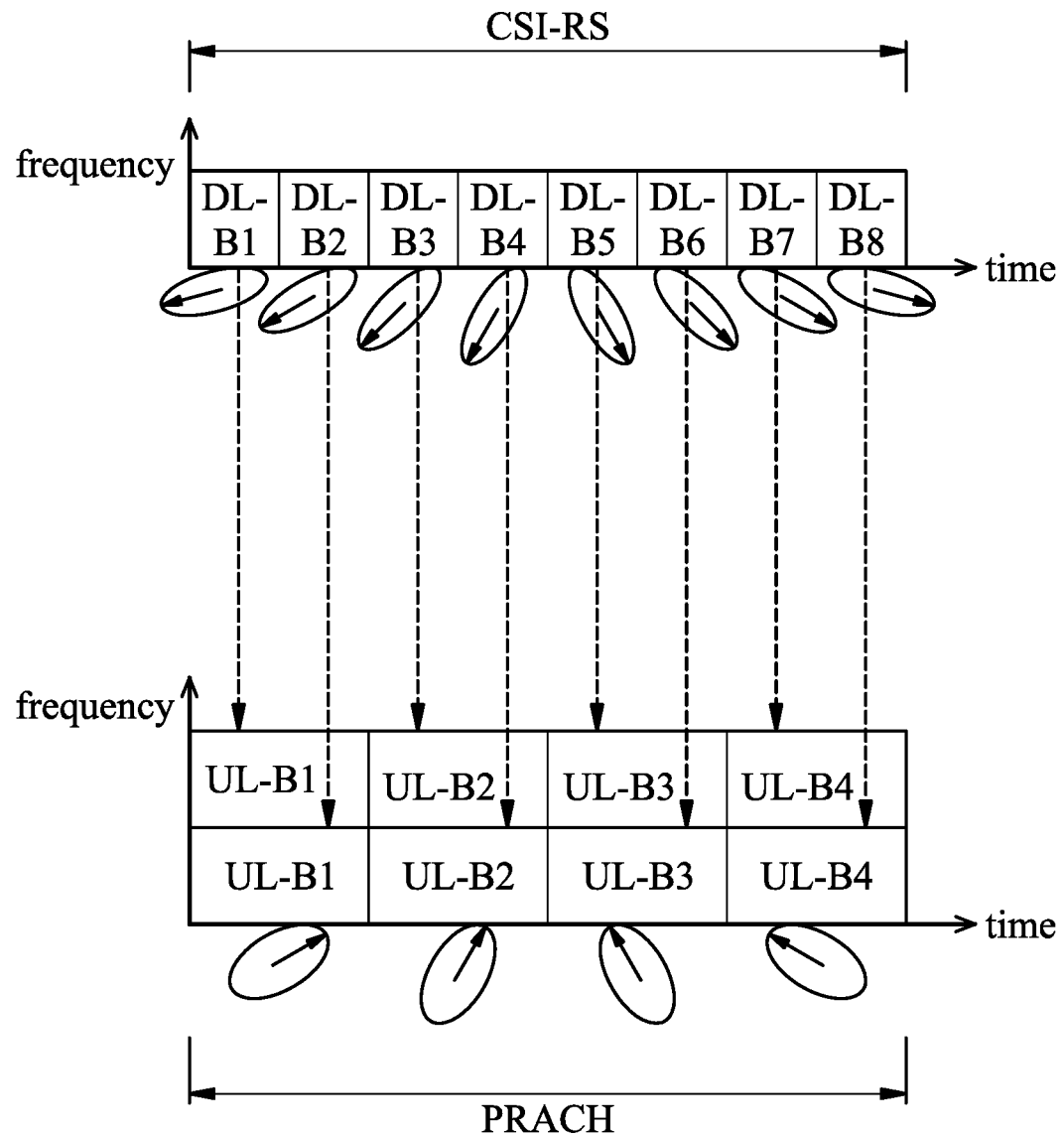
FIG. 7 is a schematic diagram illustrating the association between the CSI-RS resources and a plurality sets of PRACH preambles and RACH occasions according to yet another embodiment of the application.

FIG. 7 is a schematic diagram illustrating the association between CSI-RS resources and a plurality of PRACH preambles and RACH occasions according to yet another embodiment of the application.

In this embodiment, the association associates one CSI-RS resource to one set of RACH occasions by Frequency Division Multiplexing (FDM).

As shown in FIG. 7, there are two RACH occasions within each PRACH time period, wherein the two RACH occasions may be differentiated at the frequency domain.

The first and second CSI-RS resources are corresponding to the first and second RACH occasions within the first PRACH time period, respectively. The third and fourth CSI-RS resources are corresponding to the first and second RACH occasions within the second PRACH time period, respectively. The fifth and sixth CSI-RS resources are corresponding to the first and second RACH occasions within the third PRACH time period, respectively. The seventh and eighth CSI-RS resources are corresponding to the first and second RACH occasions within the fourth PRACH time period, respectively.

Figure 8:
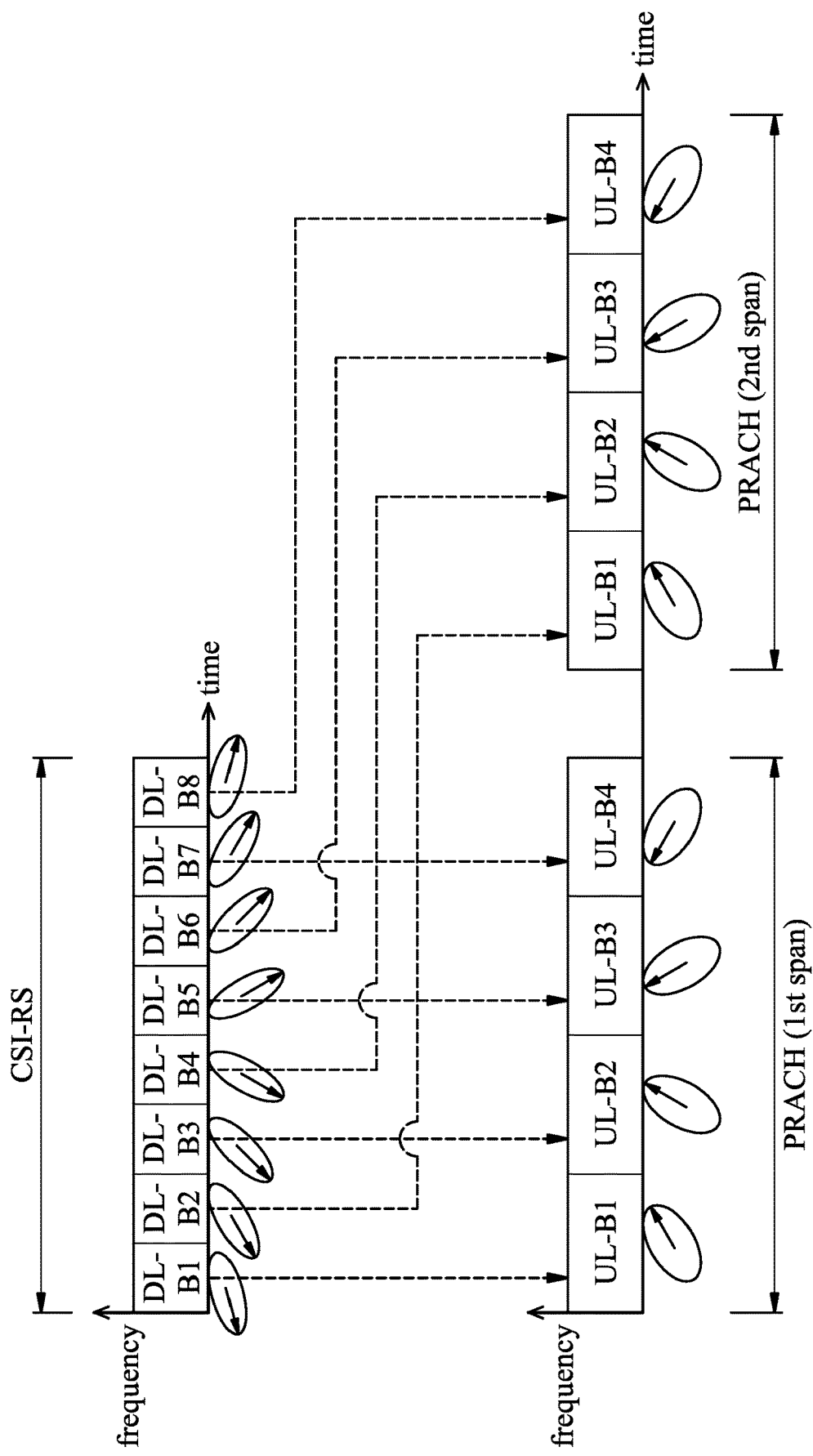
FIG. 8 is a schematic diagram illustrating the association between the CSI-RS resources and a plurality sets of PRACH preambles and RACH occasions according to still another embodiment of the application.

FIG. 8 is a schematic diagram illustrating the association between CSI-RS resources and a plurality of PRACH preambles and RACH occasions according to still another embodiment of the application.

In this embodiment, the association associates one CSI-RS resource to one set of PRACH preambles and RACH occasions by Time Division Multiplexing (TDM).

As shown in FIG. 8, the four RACH occasions are duplicated at the time domain, wherein each of the eight RACH occasions may be differentiated at the time domain with the same frequency range.

The first and second CSI-RS resources are corresponding to the first RACH occasion within the first span of the time domain and the first RACH occasion within the second span of the time domain, respectively. The third and fourth CSI-RS resources are corresponding to the second RACH occasion within the first span of the time domain and the second RACH occasion within the second span of the time domain, respectively. The fifth and sixth CSI-RS resources are corresponding to the third RACH occasion within the first span of the time domain and the third RACH occasion within the second span of the time domain, respectively. The seventh and eighth CSI-RS resources are corresponding to the fourth RACH occasion within the first span of the time domain and the fourth RACH occasion within the second span of the time domain, respectively.

The advantages of the associations in FIGS. 6 to 8 are that the new beam information may be fully conveyed through the first step of a random access procedure and narrower beams may be used for the messages of the third step (i.e., uplink transmission) and fourth step (e.g., contention resolution) of a contention-based random access procedure (narrower beam may render better spectral efficiency). Please note that the association between downlink reference signals (i.e., CSI-RS resources and/or SS/PBCH blocks) and a plurality sets of PRACH preambles and/or RACH occasions can be based on any combination of the above mentioned CDM, FDM, and TDM methods.

Figure 9:
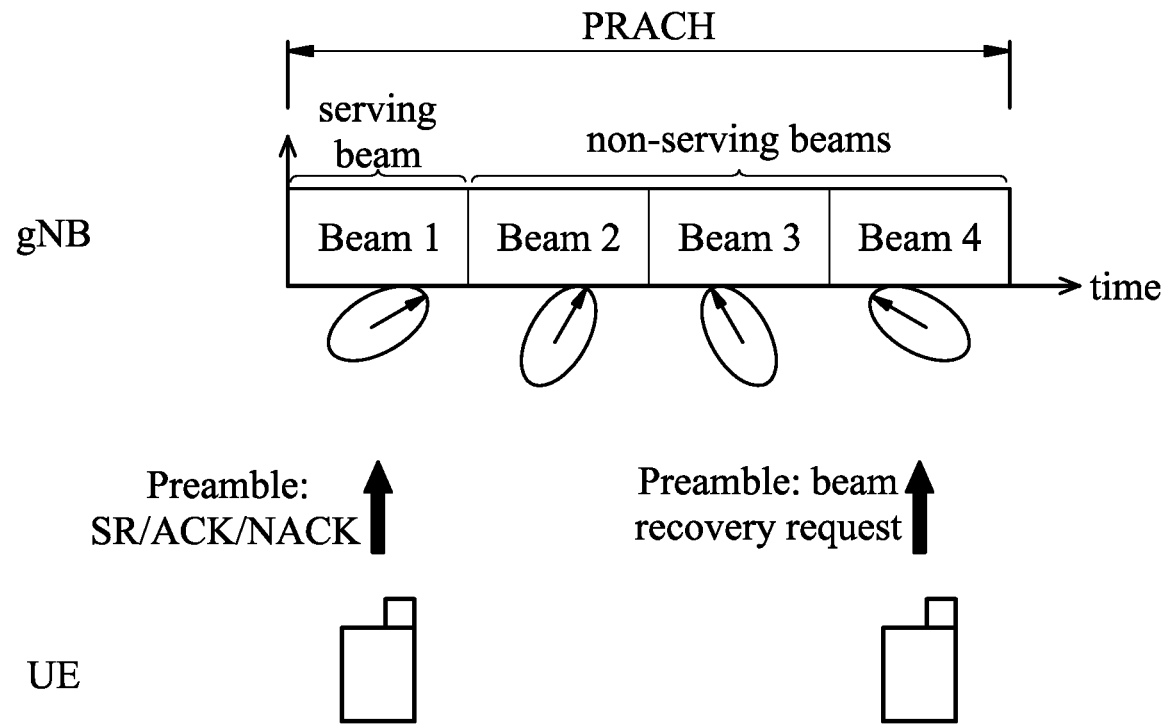
FIG. 9 is a schematic diagram illustrating a joint PRACH design for beam failure recovery and other uplink requests or indications according to an embodiment of the application.

FIG. 9 is a schematic diagram illustrating a joint PRACH design for beam failure recovery and other uplink requests or indication according to an embodiment of the application.

In this embodiment, a dedicated preamble may be allocated for beam failure recovery and other uplink requests or indication, such as scheduling request or an acknowledgement (ACK) or non-acknowledgement (NACK) signal.

Specifically, when transmitted on one of the serving beam(s) (denoted as Beam1 in FIG. 9), the dedicated preamble serves as a scheduling request or an ACK/NACK signal. When transmitted on one of the non-serving beams (denoted as Beam2 to Beam4 in FIG. 9), the dedicated preamble serves as a request for beam failure recovery.

As shown in FIG. 9, the preamble may serve as a scheduling request when it is transmitted on Beam1 (i.e., the serving beam), and may serve as a request for beam failure recovery when it is transmitted on Beam 4 (i.e., a non-serving beam).

Please note that, in the present application, more flexible PRACH designs for improving the efficiency of PRACH resource utilization are proposed. For example, different preambles may be flexibly split for asynchronous and synchronous transmissions within a RACH occasion, and/or the bandwidth by utilizing a preamble format with a smaller sequence length or by configuring a smaller sub-carrier spacing, and/or cyclic shift used for synchronous transmission may be reduced to be smaller than those used for asynchronous transmission.

Figure 10:
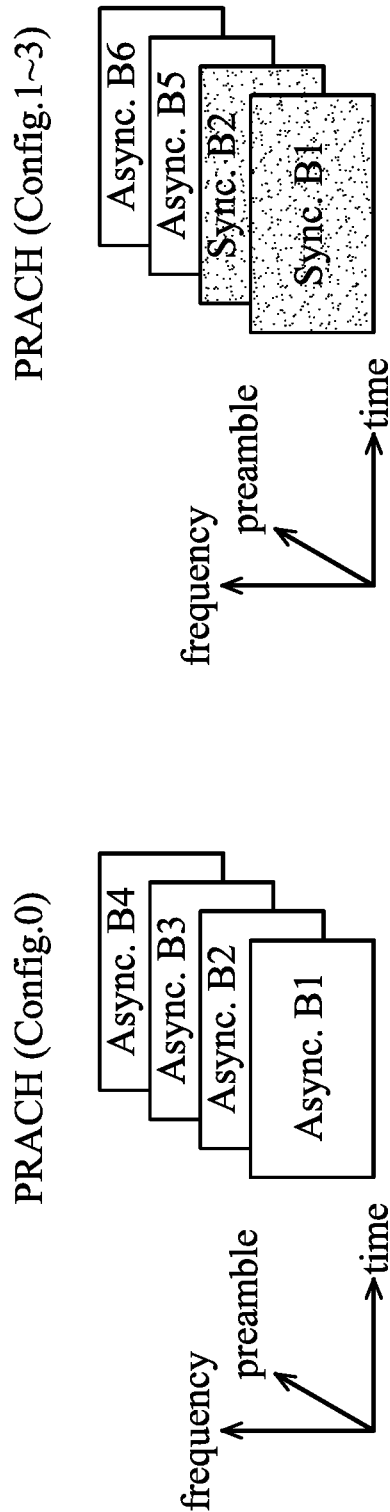
FIG. 10 is a schematic diagram illustrating a PRACH resource utilization for asynchronous and synchronous transmissions according to an embodiment of the application.

FIG. 10 is a schematic diagram illustrating a PRACH resource utilization for asynchronous and synchronous transmissions according to an embodiment of the application.

As shown in FIG. 10, there are four different PRACH configurations for the same PRACH time-frequency resource. In the first PRACH configuration (denoted as Config.0 in FIG. 10), the preambles generated using all Zadoff-Chu (ZC) roots are for asynchronous transmissions, and the PRACH resource blocks for asynchronous transmissions using different preambles are denoted as Async.B1 to Async.B4.

In the rest of the PRACH configurations (denoted as Config.1 to Config.3 in FIG. 10), the preambles generated using all ZC roots are split for asynchronous and synchronous transmissions within the same PRACH time-frequency resource, and the PRACH resource blocks for asynchronous transmissions using different preambles are denoted as Async.B5 to Async.B6, while the PRACH resource blocks for synchronous transmissions using different preambles are denoted as Sync.B1 to Sync.B2.

An example of the preambles and the number of ZC roots used for asynchronous and synchronous transmissions in each PRACH configuration is provided in table 1 as follows (assuming that the PRACH Subcarrier Spacing (SCS) is 30 KHz, and the Inter-Site Distance (ISD) is 500 meters).

TABLE 1

| Configuration # | # of ZC roots for Asyn. Tx | # of preambles for Asyn. Tx (upper bound) | # of ZC roots for Syn. Tx | # of preambles for Syn. Tx (upper bound) |
|---|---|---|---|---|
| 0 | 6 | 60 | 0 | 0 |
| 1 | 5 | 50 | 1 | 33 |
| 2 | 4 | 40 | 2 | 66 |
| 3 | 3 | 30 | 3 | 99 |

For uplink synchronous PRACH attempts or PRACH attempts that are not followed by Physical Uplink Control Channel (PUCCH) or Physical Uplink Shared Channel (PUSCH) transmissions, the gNB does not need to include the Timing Advance (TA) command and the temporary Cell Radio Network Temporary Identifier (C-RNTI) in the response to these PRACH attempts.

Figure 11:
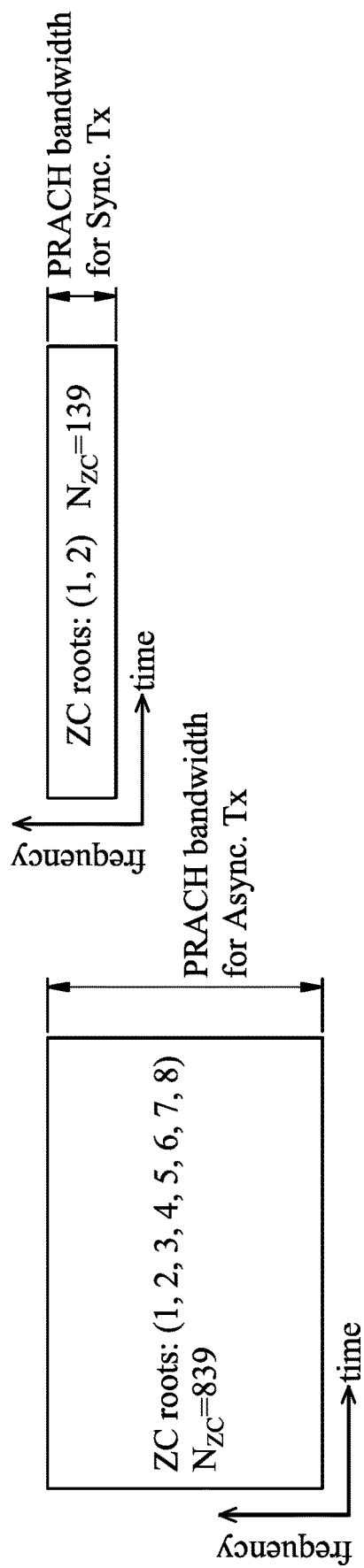
FIG. 11 is a schematic diagram illustrating the PRACH preamble bandwidths for asynchronous and synchronous transmissions according to an embodiment of the application.

FIG. 11 is a schematic diagram illustrating the PRACH preamble bandwidths for asynchronous and synchronous transmissions according to an embodiment of the application.

The PRACH time-frequency resource used for asynchronous transmissions is shown on the left side of FIG. 11, in which the number of ZC roots is 8 and the length of preamble sequences is 839. The PRACH time-frequency resource used for synchronous transmissions (where TA estimation is not required) is shown on the right side of FIG. 11, in which the number of ZC roots is 2 and the length of preamble sequences is 139. That is, the PRACH preamble bandwidth for synchronous transmission is narrower than the PRACH preamble bandwidth for asynchronous transmission. In other words, the PRACH bandwidth can be reduced by configuring a preamble format with a smaller sequence length or by configuring a smaller sub-carrier spacing.

Due to the fact that the preamble sequence is shortened and the number of ZC roots within the PRACH time-frequency resource for synchronous transmissions is reduced, the Multiple Access Interference (MAI) from other root sequences may be reduced.

In addition, since TA estimation is not required for synchronous PRACH transmissions, the cyclic shift does not need to cover the round-trip propagation delay, and the cyclic shift applied for generating the preambles may be reduced.

Alternatively, the PRACH preamble bandwidth and the cyclic shift used for synchronous transmission may be reduced to be smaller than those used for asynchronous transmission.

Figure 12:
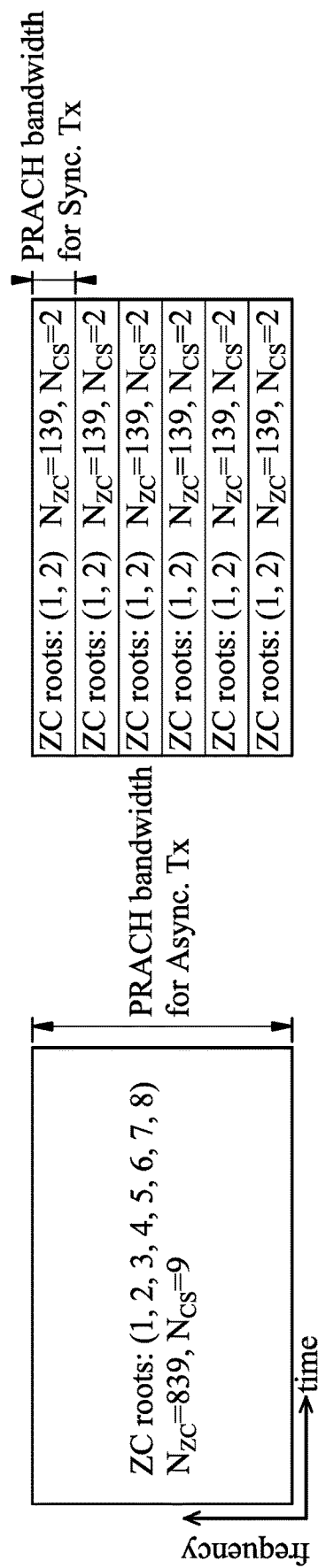
FIG. 12 is a schematic diagram illustrating a PRACH resource utilization for asynchronous and synchronous transmissions according to another embodiment of the application.

FIG. 12 is a schematic diagram illustrating a PRACH resource utilization for asynchronous and synchronous transmissions according to another embodiment of the application.

The PRACH time-frequency resource for asynchronous transmissions is shown on the left side of FIG. 12, in which the number of ZC roots is 8, the length of preamble sequences is 839, and the cyclic shift is 9. The PRACH time-frequency resources for synchronous transmissions are shown on the right side of FIG. 12, in which the number of ZC roots is 2, the length of preamble sequences is 139, and the cyclic shift is 2.

As shown in FIG. 12, there may be multiple PRACH time-frequency resources for synchronous transmissions allocated within the same PRACH time period. Advantageously, this allocation may achieve the target preamble opportunities without introducing severe MAI from other root sequences.

In view of the forgoing embodiments, it will be appreciated that the present application realizes beam failure recovery or beam handover through the PRACH, by providing an association between the downlink reference signals (e.g., CSI-RS resources, and/or SS/PBCH blocks) and the PRACH resources (including the sets of PRACH preambles, RACH occasions, or any combination thereof) for beam identification. Also, the present application realizes more flexible PRACH designs, by allowing different preambles to be flexibly split for asynchronous and synchronous transmissions within a PRACH time-frequency resource, and/or reducing the bandwidth and/or cyclic shift used for synchronous transmission to be smaller than those used for asynchronous transmission. Advantageously, spectral efficiency and the efficiency of PRACH utilization may be significantly improved.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A User Equipment (UE), comprising:
a wireless transceiver, configured to perform wireless transmission and reception to and from a cellular station; and
a controller, configured to select a downlink reference signal associated with a candidate beam among a plurality of downlink reference signals comprising Channel State Information-Reference Signal (CSI-RS) resources, Synchronization Signal (SS) blocks, or Physical Broadcast Channel (PBCH) blocks, determine one set from a plurality of sets of Physical Random Access Channel (PRACH) preambles and RACH occasions for the selected downlink reference signal according to an association configured between the downlink reference signals and PRACH resources, and use the determined set of PRACH preamble and RACH occasion to perform a PRACH transmission to the cellular station via the wireless transceiver,
wherein the association between the downlink reference signal and the PRACH resource indicates the downlink reference signal selected by the UE to the cellular station,
wherein the association between the downlink reference signal and the candidate beam indicates the candidate beam to the cellular station, and
wherein the cellular station identifies the candidate beam indicated by the UE based on determination of the PRACH resource.

2. The UE of claim 1, wherein the candidate beam is used for beam failure recovery or for a handover from a cell to another cell.

3. The UE of claim 1, wherein the PRACH resources comprises the PRACH preambles, the RACH occasions, or a combination thereof, and the association is configured between the downlink reference signals and the PRACH preambles, the RACH occasions, or a combination thereof.

4. The UE of claim 1, wherein, when the PRACH transmission comprises transmitting a first PRACH preamble using a first RACH occasion which corresponds to the selected downlink reference signal, the first PRACH preamble is used for one purpose; and when the PRACH transmission comprises transmitting the first PRACH preamble using a second RACH occasion which corresponds to another downlink reference signal, the first PRACH preamble is used for another purpose.

5. The UE of claim 4, wherein, when the first PRACH preamble is transmitted on a serving beam, the first PRACH preamble serves as a scheduling request or an acknowledgement (ACK) or non-acknowledgement (NACK) signal, and when the first PRACH preamble is transmitted on the candidate beam, the first PRACH preamble serves as a request for beam failure recovery.

6. The UE of claim 1, wherein the association configured between the downlink reference signals and the PRACH resources associates one CSI-RS resource, SS block, or PBCH block to one set of PRACH resource, or associates multiple CSI-RS resources, SS blocks, or PBCH blocks to one set of PRACH resource.

7. The UE of claim 6, wherein, when the association configured between the downlink reference signals and the PRACH resources associates multiple CSI-RS resources, SS blocks, or PBCH blocks to one set of PRACH resource, the controller is further configured to transmit an uplink transmission to the cellular station via the wireless transceiver for identifying which one of the multiple CSI-RS resources, SS blocks, or PBCH blocks is associated with the candidate beam.

8. The UE of claim 6, wherein the association configured between the downlink reference signals and the PRACH resources associates one CSI-RS resource, SS block, or PBCH block to one set of PRACH resource, by at least one of: Code Division Multiplexing (CDM), Frequency Division Multiplexing (FDM), and Time Division Multiplexing (TDM).

9. A method for beam identification through a PRACH, executed by a UE wirelessly connected to a cellular station, the method comprising:
selecting a downlink reference signal associated with a candidate beam among a plurality of downlink reference signals comprising CSI-RS resources, SS blocks, or PBCH blocks;
determining one set from a plurality of sets of PRACH preambles and RACH occasions for the selected downlink reference signal according to an association configured between the downlink reference signals and PRACH resources; and
using the determined set of PRACH preamble and RACH occasion to perform a PRACH transmission to the cellular station,
wherein the association between the downlink reference signal and the PRACH resource indicates the downlink reference signal selected by the UE to the cellular station,
wherein the association between the downlink reference signal and the candidate beam indicates the candidate beam to the cellular station, and
wherein the cellular station identifies the candidate beam indicated by the UE based on determination of the PRACH resource.

10. The method of claim 9, wherein the candidate beam is used for beam failure recovery or for a handover from a cell to another cell.

11. The method of claim 9, wherein the PRACH resources comprises the PRACH preambles, the RACH occasions, or a combination thereof, and the association is configured between the downlink reference signals and the PRACH preambles, the RACH occasions, or a combination thereof.

12. The method of claim 9, wherein, when the PRACH transmission comprises transmitting a first PRACH preamble using a first RACH occasion which corresponds to the selected downlink reference signal, the first PRACH preamble is used for one purpose; and when the PRACH transmission comprises transmitting the first PRACH preamble using a second RACH occasion which corresponds to another downlink reference signal, the first PRACH preamble is used for another purpose.

13. The method of claim 12, wherein, when the first PRACH preamble is transmitted on a serving beam, the first PRACH preamble serves as a scheduling request or an ACK or NACK signal, and when the first PRACH preamble is transmitted on the candidate beam, the first PRACH preamble serves as a request for beam failure recovery.

14. The method of claim 9, wherein the association configured between the downlink reference signals and the PRACH resources associates one CSI-RS resource, SS block, or PBCH block to one set of PRACH resource, or associates multiple CSI-RS resources, SS blocks, or PBCH blocks to one set of PRACH resource.

15. The method of claim 14, further comprising:
when the association configured between the downlink reference signals and the PRACH resources associates multiple CSI-RS resources, SS blocks, or PBCH blocks to one set of PRACH resource, transmitting an uplink transmission to the cellular station for identifying which one of the multiple CSI-RS resource, SS blocks, or PBCH blocks is associated with the candidate beam.

16. The method of claim 9, wherein the association configured between the downlink reference signals and the PRACH resources associates one CSI-RS resource, SS block, or PBCH block to one set of PRACH resource, by at least one of: CDM, FDM, and TDM.

17. A cellular station, comprising:
a wireless transceiver, configured to perform wireless transmission and reception to and from a UE; and
a controller, configured to receive a PRACH transmission which utilizes a PRACH resource from the UE via the wireless transceiver, determine one of a plurality of downlink reference signals comprising CSI-RS resources, SS blocks, or PBCH blocks according to an association configured between the downlink reference signals and the PRACH resource, and identify a candidate beam associated with the determined downlink reference signal,
wherein the association between the downlink reference signal and the PRACH resource indicates the downlink reference signal selected by the UE to the cellular station,
wherein the association between the downlink reference signal and the candidate beam indicates the candidate beam to the cellular station, and
wherein the cellular station identifies the candidate beam indicated by the UE based on determination of the PRACH resource, wherein the PRACH transmission comprising a PRACH preamble transmitted on a RACH occasion, and the association is configured between the downlink reference signals and the PRACH preamble, the RACH occasion, or a combination thereof.

18. The cellular station of claim 17, wherein the candidate beam is identified for beam failure recovery, or for a handover from a cell to another cell.

19. The cellular station of claim 17, wherein the association configured between the downlink reference signals and the PRACH resource associates one CSI-RS resource, SS block, or PBCH block to one set of PRACH resource, or associates multiple CSI-RS resources, SS blocks, or PBCH blocks to one set of PRACH resource.

20. A method for beam identification through a PRACH, executed by a cellular station wirelessly connected to a UE, the method comprising:
receiving a PRACH transmission which utilizes a PRACH resource from the UE;
determining one of a plurality of downlink reference signals comprising CSI-RS resources, SS blocks, or PBCH blocks according to an association configured between the downlink reference signals and the PRACH resource; and
identifying a candidate beam associated with the determined downlink reference signal,
wherein the association between the downlink reference signal and the PRACH resource indicates the downlink reference signal selected by the UE to the cellular station,
wherein the association between the downlink reference signal and the candidate beam indicates the candidate beam to the cellular station, and
wherein the cellular station identifies the candidate beam indicated by the UE based on determination of the PRACH resource, wherein the PRACH transmission comprising a PRACH preamble transmitted on a RACH occasion, and the association is configured between the downlink reference signals and the PRACH preamble, the RACH occasion, or a combination thereof.

21. The method of claim 20, wherein the candidate beam is identified for beam failure recovery, or for a handover from a cell to another cell.

22. The method of claim 20, wherein the association configured between the downlink reference signals and the PRACH resource associates one CSI-RS resource, SS block, or PBCH block to one set of PRACH resource, or associates multiple CSI-RS resources, SS blocks, or PBCH blocks to one set of PRACH resource.

* * * * *